US009307488B2

(12) United States Patent
Hanson et al.

(10) Patent No.: US 9,307,488 B2
(45) Date of Patent: *Apr. 5, 2016

(54) WIRELESS DEVICE REGISTRATION, SUCH AS AUTOMATIC REGISTRATION OF A WI-FI ENABLED DEVICE

(71) Applicant: T-Mobile USA, Inc., Bellevue, WA (US)

(72) Inventors: Mark Hanson, Carrollton, TX (US); Paulo S. T. Chow, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,434

(22) Filed: Feb. 23, 2015

(65) Prior Publication Data
US 2015/0264639 A1 Sep. 17, 2015

Related U.S. Application Data

(63) Continuation of application No. 13/960,745, filed on Aug. 6, 2013, now Pat. No. 8,964,715, which is a continuation of application No. 12/442,386, filed as application No. PCT/US2007/079222 on Sep. 21, 2007, now Pat. No. 8,503,358.

(Continued)

(51) Int. Cl.
*H04W 12/08* (2009.01)
*H04W 48/16* (2009.01)
(Continued)

(52) U.S. Cl.
CPC ............ *H04W 48/16* (2013.01); *H04L 63/0853* (2013.01); *H04W 12/06* (2013.01); *H04W 12/08* (2013.01); *H04W 60/00* (2013.01); *H04W 8/24* (2013.01); *H04W 84/12* (2013.01)

(58) Field of Classification Search
CPC ..... H04W 48/16; H04W 60/00; H04W 12/06; H04W 84/12
See application file for complete search history.

(56) References Cited

U.S. PATENT DOCUMENTS 7,136,651 B2 11/2006 Kalavade
7,171,460 B2 1/2007 Kalavade et al.
(Continued)

FOREIGN PATENT DOCUMENTS

WO 2008036938 3/2008

OTHER PUBLICATIONS

European Patent Office, Supplementary European Search Report, EP Patent Application 07843013.9, mailed Dec. 23, 2014, 6 pages.
(Continued)

*Primary Examiner* — Jay P Patel
(74) *Attorney, Agent, or Firm* — Perkins Coie LLP

(57) ABSTRACT

A system for providing a wireless device with access to a computer network includes an access point that sets up a radio link with the wireless device and couples the wireless device to the network. The system also includes a server that receives data packets from the access point through the computer network. The data packets include at least one data packet that has a first identifier that uniquely identifies the wireless device and a second identifier that corresponds to the wireless device. The system further includes a database that is coupled to the server and stores data for associating a service plan with the first and second identifiers and basing the service plan, at least in part, on the second identifier. Other features and systems are also disclosed.

20 Claims, 5 Drawing Sheets

Related U.S. Application Data

(60) Provisional application No. 60/846,697, filed on Sep. 21, 2006, provisional application No. 60/846,650, filed on Sep. 21, 2006.

(51) Int. Cl.
  *H04L 29/06* (2006.01)
  *H04W 12/06* (2009.01)
  *H04W 60/00* (2009.01)
  H04W 8/24 (2009.01)
  H04W 84/12 (2009.01)

(56) References Cited

U.S. PATENT DOCUMENTS

| | | |
|---|---|---|
| 7,260,638 B2 | 8/2007 | Crosbie |
| 7,420,956 B2 | 9/2008 | Karaoguz et al. |
| 7,457,608 B2 | 11/2008 | Shah |
| 7,499,401 B2 | 3/2009 | Buddhikot et al. |
| 7,512,796 B2 | 3/2009 | Haverinen et al. |
| 7,593,730 B2 | 9/2009 | Khandelwal et al. |
| 7,653,200 B2 | 1/2010 | Karmi et al. |
| 7,835,294 B2 | 11/2010 | Shuster |
| 7,864,673 B2 | 1/2011 | Bonner |
| 8,149,747 B2 | 4/2012 | Sood et al. |
| 8,503,358 B2 | 8/2013 | Hanson et al. |
| 8,964,715 B2 | 2/2015 | Hanson et al. |
| 2002/0068543 A1 | 6/2002 | Shah |
| 2002/0077077 A1 | 6/2002 | Rezvani et al. |
| 2002/0083178 A1 | 6/2002 | Brothers |
| 2002/0136226 A1 | 9/2002 | Christoffel et al. |
| 2003/0013434 A1 | 1/2003 | Rosenberg et al. |
| 2003/0051041 A1 | 3/2003 | Kalavade et al. |
| 2003/0233329 A1 | 12/2003 | Laraki et al. |
| 2004/0168052 A1 | 8/2004 | Clisham et al. |
| 2005/0091483 A1 | 4/2005 | Fascenda |
| 2005/0144237 A1 | 6/2005 | Heredia et al. |
| 2005/0175019 A1* | 8/2005 | Kalavade et al. ............ 370/400 |
| 2005/0177515 A1* | 8/2005 | Kalavade et al. ............ 705/52 |
| 2005/0193198 A1 | 9/2005 | Livowsky |
| 2005/0223111 A1 | 10/2005 | Bhandaru et al. |
| 2005/0232210 A1 | 10/2005 | Karaoguz et al. |
| 2005/0233693 A1 | 10/2005 | Karaoguz et al. |
| 2005/0233744 A1 | 10/2005 | Karaoguz et al. |
| 2005/0239445 A1 | 10/2005 | Karaoguz et al. |
| 2006/0002334 A1 | 1/2006 | Washburn |
| 2006/0008256 A1 | 1/2006 | Khedouri et al. |
| 2006/0025132 A1 | 2/2006 | Karaoguz et al. |
| 2006/0046714 A1 | 3/2006 | Kalavade |
| 2006/0064374 A1 | 3/2006 | Helsper et al. |
| 2006/0136630 A1 | 6/2006 | Eid et al. |
| 2006/0161635 A1 | 7/2006 | Lamkin et al. |
| 2006/0181397 A1 | 8/2006 | Limbachiya |
| 2006/0208066 A1 | 9/2006 | Finn et al. |
| 2006/0236369 A1 | 10/2006 | Covington et al. |
| 2006/0268799 A1 | 11/2006 | Huang et al. |
| 2006/0286977 A1 | 12/2006 | Khandelwal et al. |
| 2006/0291474 A1 | 12/2006 | Ollis et al. |
| 2007/0001843 A1 | 1/2007 | Forster et al. |
| 2007/0041560 A1 | 2/2007 | Turcotte |
| 2007/0091845 A1 | 4/2007 | Brideglall |
| 2007/0171870 A1 | 7/2007 | Oba et al. |
| 2007/0208934 A1 | 9/2007 | Heffez |
| 2007/0218837 A1 | 9/2007 | Lessing et al. |
| 2008/0037444 A1 | 2/2008 | Chhabra |

OTHER PUBLICATIONS

International Search Report and Written Opinion, International Application No. PCT/US2007/79222, filed on Sep. 21, 2007, Applicant: T-Mobile USA, Inc., mailed Mar. 19, 2008, 10 pages.

* cited by examiner

| UNIQUE DEVICE IDENTIFIER 402 | Wi-Fi SERVICE IDENTIFIER 404 | | Wi-Fi SERVICE PLAN 406 | | | OTHER CREDENTIALS 408 | |
|---|---|---|---|---|---|---|---|
| | MANUFACTURER/ VENDOR | DEVICE/ MODEL | RATE | QoS | OTHER | TIME STAMP | IP ADDRESS |
| MAC ADDRESS | ELECTRONICS COMPANY A | DIGITAL CAMERA | TRIAL | - | - | 6 MONTH TIME PERIOD | - |
| MAC ADDRESS | - | DIGITAL CAMERA | FLAT | - | - | - | - |
| MAC ADDRESS | - | MP3 PLAYER | TRIAL | - | - | 3 MONTH TIME PERIOD | - |
| MAC ADDRESS | - | VoIP PHONE | FLAT | HIGH | - | - | - |
| MAC ADDRESS | - | LAPTOP | FLAT | MED | - | - | - |
| GUID | CELLULAR SERVICE PROVIDER B | VoIP PHONE | FLAT | - | REDUCED RATE | - | IDENTIFIED |
| GUID | - | VoIP PHONE | FLAT | - | STAND. RATE | - | IDENTIFIED |

Fig. 4

| WISPr USER NAME 502 | | | WISPr PASSWORD CONTENT 504 | | |
|---|---|---|---|---|---|
| USERNAME | SERVICE ID | FLAG | IP ADDRESS | MAC | USER PASSWORD |
| DEFAULT ACCOUNT NAME STORED AT THE DEVICE OR GENERATED BY THE SERVER | MANUFACTURER, VENDOR, DEVICE, AND/OR MODEL IDENTIFER | MAY HAVE VARIOUS VALUES | THE "DOT NOTATION" EXPRESSION OF THE IP ADDRESS CURRENTLY ASSIGNED TO THE DEVICE | ADDRESS CURRENTLY USED BY THE DEVICE EXPRESSED AS 12 HEXADECIMAL CHARACTERS | DEFAULT PASSWORD EITHER STORED OR MANUALLY ENTERED AT A PROMPT |
| | EXAMPLE:<br>SERVICE ID = 0123ABCDFGH<br>FLAG = ABC<br>IP ADDRESS = 10.1.2.3<br>MAC = 0123456789AB<br>PASSWORD = my password | | | | |
| EXAMPLE:<br>"<default>@provider.com" | WISPr PASSWORD = 0123ABCDFGH/ABC/10.1.2.3/0123456789AB/mypassword | | | | |

*Fig. 5*

WIRELESS DEVICE REGISTRATION, SUCH AS AUTOMATIC REGISTRATION OF A WI-FI ENABLED DEVICE

CROSS-REFERENCE TO RELATED APPLICATION(S)

This application is a continuation of U.S. patent application Ser. No. 13/960,745, filed Aug. 6, 2013, entitled WIRELESS DEVICE REGISTRATION, SUCH AS AUTOMATIC REGISTRATION OF A WI-FI ENABLED DEVICE, now U.S. Pat. No. 8,964,715; which is a continuation of U.S. patent application Ser. No. 12/442,386 filed on Nov. 4, 2009, now U.S. Pat. No. 8,503,358, entitled WIRELESS DEVICE REGISTRATION, SUCH AS AUTOMATIC REGISTRATION OF A WI-FI ENABLED DEVICE; which is a U.S. National Stage application of International Application No. PCT/US2007/079222, entitled WIRELESS DEVICE REGISTRATION, SUCH AS AUTOMATIC REGISTRATION OF A WI-FI ENABLED DEVICE, filed Sep. 21, 2007, which claims priority to U.S. Provisional Patent Application Nos. 60/846,697 and 60/846,650, filed Sep. 21, 2006, each of which are hereby incorporated by reference.

BACKGROUND

Wireless local area networks (WLAN), and wireless wide area networks (WWAN), are becoming increasingly available in most metropolitan and some suburban areas. These wireless networks operate under a variety of standards, including IEEE 802.11 (including 802.11(a), (b) and (g), often referred to as "Wi-Fi") and IEEE 802.16 (often referred to as "WiMax"). A user with a laptop and wireless connection can readily gain access the Internet or other networks via such hot spots.

A laptop must typically register with a WLAN or WWAN service provider, Wireless Internet Service Provider (WISP), or other service providers so as to gain desired network access. To do so, the user provides a user name and password which identifies the user. However, this information does not identify the wireless device accessing the network. Prior systems have used http clients or user agents to identify devices, such as by type of browser. These methods are not secure. Further, they may not positively identify the device connected to the network. For example, identifiers such as Media Access Control (MAC) addresses often have arbitrary (yet unique) values that cannot be readily looked up (e.g., in a database) due to a multitude of component sources and further, are readily changeable in most devices. Moreover, if multiple rate plans are associated with the user or device, these plans cannot be readily associated with the user or device without additional information, and if so, could be prone to being hacked or otherwise compromised by malicious activity. For example, the IP address of a particular device can be "spoofed."

The above examples of some related systems and associated limitations are intended to be illustrative and not exclusive. Other limitations of existing prior systems will become apparent to those skilled in the art upon reading the following Detailed Description. Overall, there is a need for a system that overcomes the above problems as well as provides additional benefits.

BRIEF DESCRIPTION OF THE DRAWINGS

FIG. 4 is an example of a data structure or table employed by the network server under the system of FIG. 1.

FIG. 5 is a table showing an example of header fields that may be employed in one or more data packets communicated to the network server under the system of FIG. 1.

DETAILED DESCRIPTION

Figure 1:
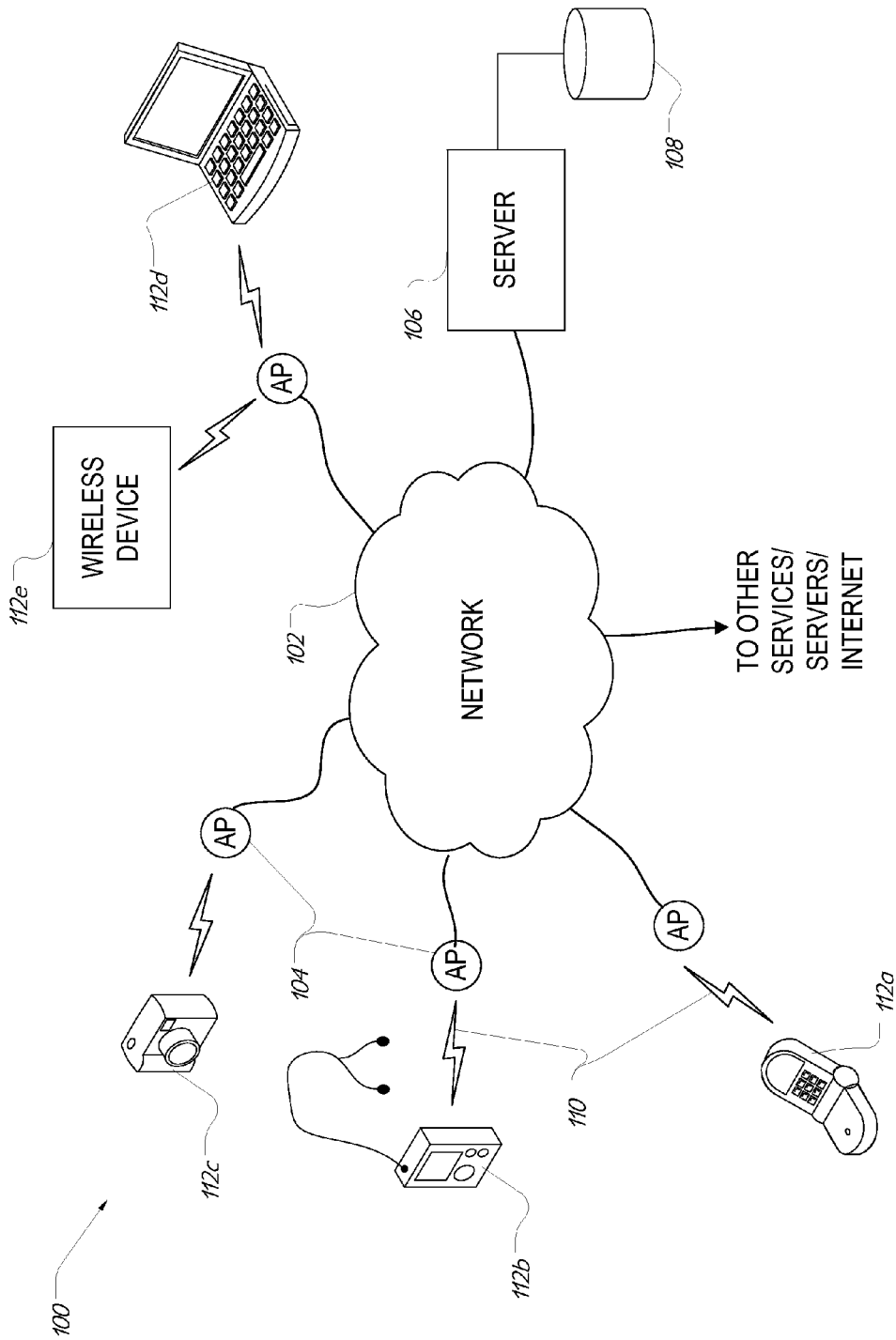
FIG. 1 is a block diagram illustrating a system for providing various wireless devices with access to a wireless network under aspects of the invention.

As described in detail below, systems and associated methods embed or provide one or more codes within wireless enabled or wireless access devices, where the codes identify a vendor or manufacturer and/or a device or model. The codes may be transmitted securely to a wireless access point and used by a network server (with associated database) to authorize and establish wireless service under an appropriate account. Any of a variety of wireless devices or wireless enabled components can be employed, for example, as a Wi-Fi enabled camera, wireless MP3/audio device, as well as traditional wireless devices such as laptops or mobile phones.

Notably, various classes of service can be associated with each device, manufacturer, venue, or data payload. For example, devices from a particular manufacture may receive a preferred service plan having a preferred rate. Alternatively or additionally, all wireless cameras owned by a particular individual may receive a preferred rate plan regardless of the manufacturer. Alternatively or additionally, users may receive different rate plans depending upon the venue or location, such as a per minute plan in airports, train stations, and the like, but different rate plans, such as hourly or daily at hotels, convention centers, etc. Alternatively or additionally, different types of data or data payload type may receive different rate plans, such as voice traffic (e.g., voice over IP (VoIP)) receiving a different rate plan than wirelessly accessed video or audio/music content.

Under the suitable system described in detail herein, a Wi-Fi-, WiMax- or similarly-enabled device and compatible access point (AP) employ known communication protocols, such as Wireless Internet Service Provider (WISP) roaming, and a smart client interface, to permit secure transfer of information between the device and the AP. For example, HTTPS is used to encrypt or secure the manufacturer and model codes provided by the wireless device. The manufacturer and model codes can be securely stored in tamper-resistant memory of the device, and transmitted in header information provided by the device to the AP.

The network server employs the manufacturer and model codes, as well as possibly other information, to establish an appropriate WISP access account and rate plan. A unique Media Access Control (MAC) address uniquely identifies each device, and helps to uniquely identify each account in the database. (Of course, other unique identifiers or globally unique identifiers (GUID) may be used.) A timestamp can be added, which may be used to identify a starting point for trial access that may be provided for a limited time period, as well as identifying time for periodic automatic billings.

While "Wi-Fi" is used herein as an example, the system may employ any type of wireless protocol, including wireless local, wide and metropolitan area network (WLAN, WWAN, WMAN, respectively) access protocols. For example, wireless protocols can be based on any of the 802.11 IEEE standards. Some embodiments the system can employ Bluetooth, Ultra-wideband, WiMAX, or ZigBee protocols. Further, while a particular system employing wireless devices communicating with a network server via an AP and network (e.g. the Internet), other system configurations are possible. For example, a system can include a computer that provides a physical network link to the Internet and also provides a wireless bridge to a peripheral device (e.g., a wireless device or another computer).

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

FIG. 1 and the following discussion provide a brief, general description of a suitable environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Referring to FIG. 1, a system 100 for providing a wireless device 112 with access to a computer network is shown. The system 100 includes a computer network 102, one or more APs 104, a server 106, and a database 108. While a single computer network 102 is shown in FIG. 1, two or more networks may well be interposed between the wireless devices and the server 106, such as wireless LANs between the wireless devices and the APs, and one or more a wired networks between the APs and the server. The APs 104 set up, at least in part, radio links 110 between wireless devices 112a-d and the network 102. The server 106 (e.g., a Radius server or other type of authentication server) receives data packets from the APs 104 through the network 102. These data packets can be used, for example, to authenticate network access of one or more of the wireless devices 112a-e at an individual AP 104. Such packets can include a first identifier or unique device identifier for uniquely identifying a wireless device, such as a MAC address. In many embodiments, these packets also include at least a second identifier or a Wi-Fi service identifier that corresponds to a manufacturer or vendor code, model code, or both, embedded in the wireless device, as described herein. The database 108, in operation, stores data that associates a Wi-Fi service plan with the device and service identifiers. For example, the database 108 can associate a MAC address, vendor/model code, or both (or portions thereof) with a specific service plan that should be provided to any device made by a particular manufacturer. The server 102 can later identify the service plan that should be provided to each wireless device by looking up the MAC address in the database 108. Of course, as will be described below, other examples are possible.

In many embodiments, the wireless devices are Wi-Fi enabled devices without the capability to operate full function browsers. For example, Wi-Fi enabled devices can include a VoIP phone 112a, an mp3 player 112b, a digital camera 112c, a laptop computer 112d, or any other wireless device 112e. Of course any other types of Wi-Fi or wireless enabled devices are possible, such as those that include a card or other type of peripheral adapter for communicating with an AP and over the network 102. Also, in other embodiments, two or more Wi-Fi enabled devices can communicate at a common AP. For example, the laptop 110e and the other wireless device 110e are shown in FIG. 1 as communicating with the same AP.

Figure 2:
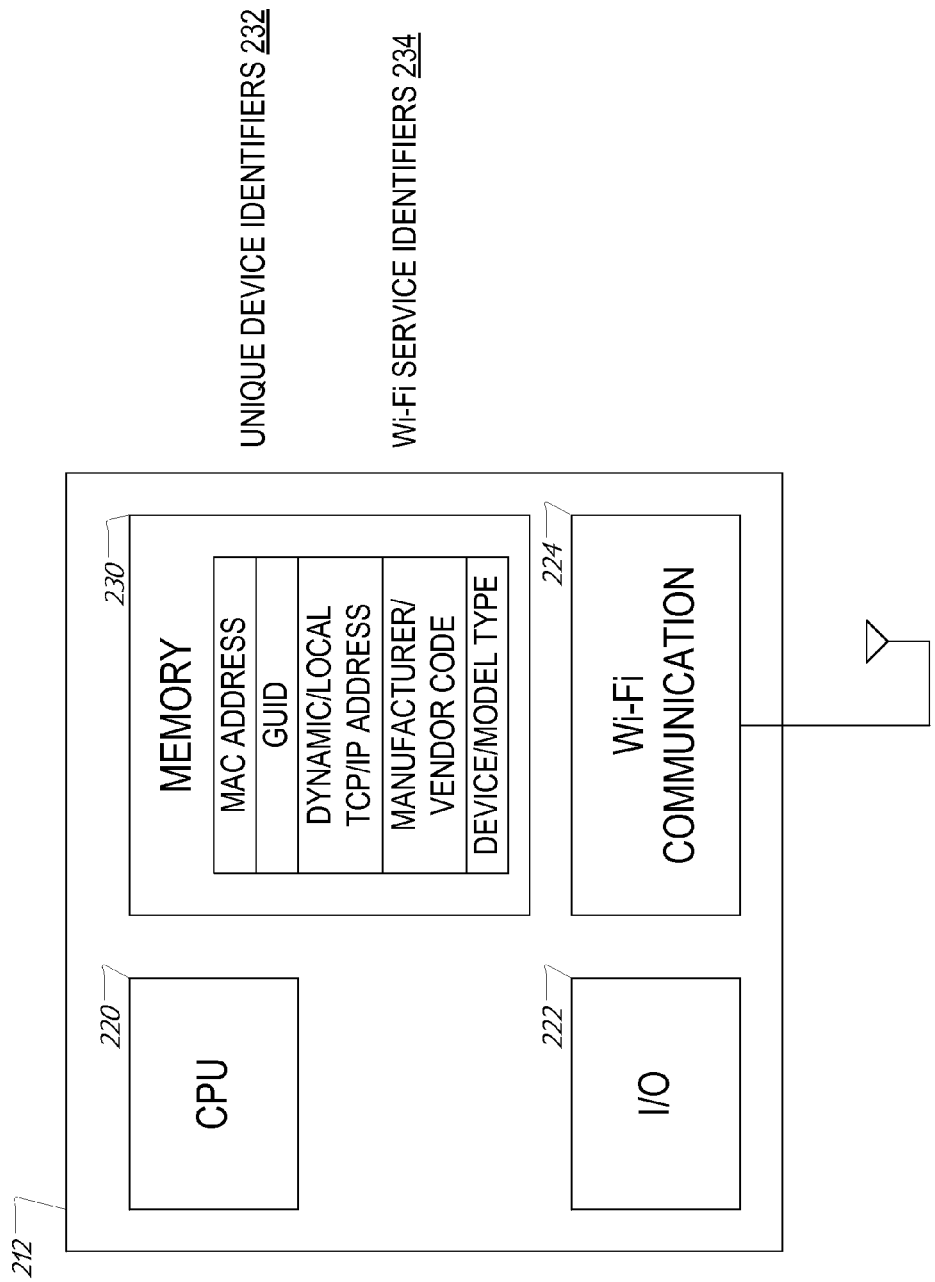
FIG. 2 is a block diagram illustrating an example of a wireless device for use in the system of FIG. 1.

Referring to FIG. 2, a simplified block diagram of wireless enabled device 212 is shown. The device 212 may be any wireless device, such as devices 112 of FIG. 1. The device 212 includes one or more CPUs 220 (e.g., a processor), an input/output component 222, a Wi-Fi communication component 224, and a memory 230. The CPU 220 can coordinate communications between the input/output component 222, the Wi-Fi component 224, and the memory 230. The input/output component 222 can include input devices such as keypads, touch screens, and other types of user input devices. The output component 222 can also include a graphical display or other type of output device for displaying data to a user, and/or audio output. The Wi-Fi component 224, in operation, can exchange data over a radio link with an AP. In many embodiments, the Wi-Fi component can also communicate with other devices that are configured to act as an AP or a Wi-Fi bridge (e.g., in an ad-hoc configuration).

In many embodiments, the memory 230 stores one or more unique device identifiers 232 and one or more Wi-Fi service identifiers 234. The device identifiers 232 can include, for example, a MAC address, a GUID or serial number, and/or a dynamically assigned IP address. In general, the unique identifier is an arbitrary yet unique value that is distinctive only to the particular device 206. The device identifiers can have values that are established by the manufacturer or vendor of the device 206 or by the manufacturer of a particular component within the device 112e. For example, manufacturers or vendors of the device 206 can program a unique identifier into the memory 230. Alternatively, a different manufacture who produces the memory 230 (e.g., before the device 212 is assembled) may set the value of the unique identifier.

The service identifiers 234, on the other hand, are not unique to the device 206. A service identifier is an embedded code that is programmed by the manufacturer or vendor of the device 212. In many embodiments, this code can directly correspond to the manufacturer or vendor of the device. Alternatively or additionally, the service identifier can be indicative of a device type (e.g., an mp3 player, a digital camera, or a VoIP phone) as well as a model type provided by a specific manufacturer or vendor. For example, the service identifier can refer to a specific model of digital camera, such as a 5 MegaPixel model or an 8 MegaPixel model.

The memory 230 can also store processing instructions that enable the CPU 220 to transmit the device and service identifiers over the Wi-Fi component 224. For example, the processing instructions may instruct the device 212 to identify a particular service set identifier (SSID) before establishing a radio link with an AP. Alternatively, the processing instructions may cause the device 212 to associate any Wi-Fi communications with an unbroadcasted SSID. In either of these examples, the SSID may be associated with a vendor of the device 212 and may only enable network access at APs that are provisioned by the vendor. The device 212 can transmit the Wi-Fi service identifier(s) in a secure or encrypted fashion, such as using secure socket layers (SSL), or other secure method.

Figure 3:
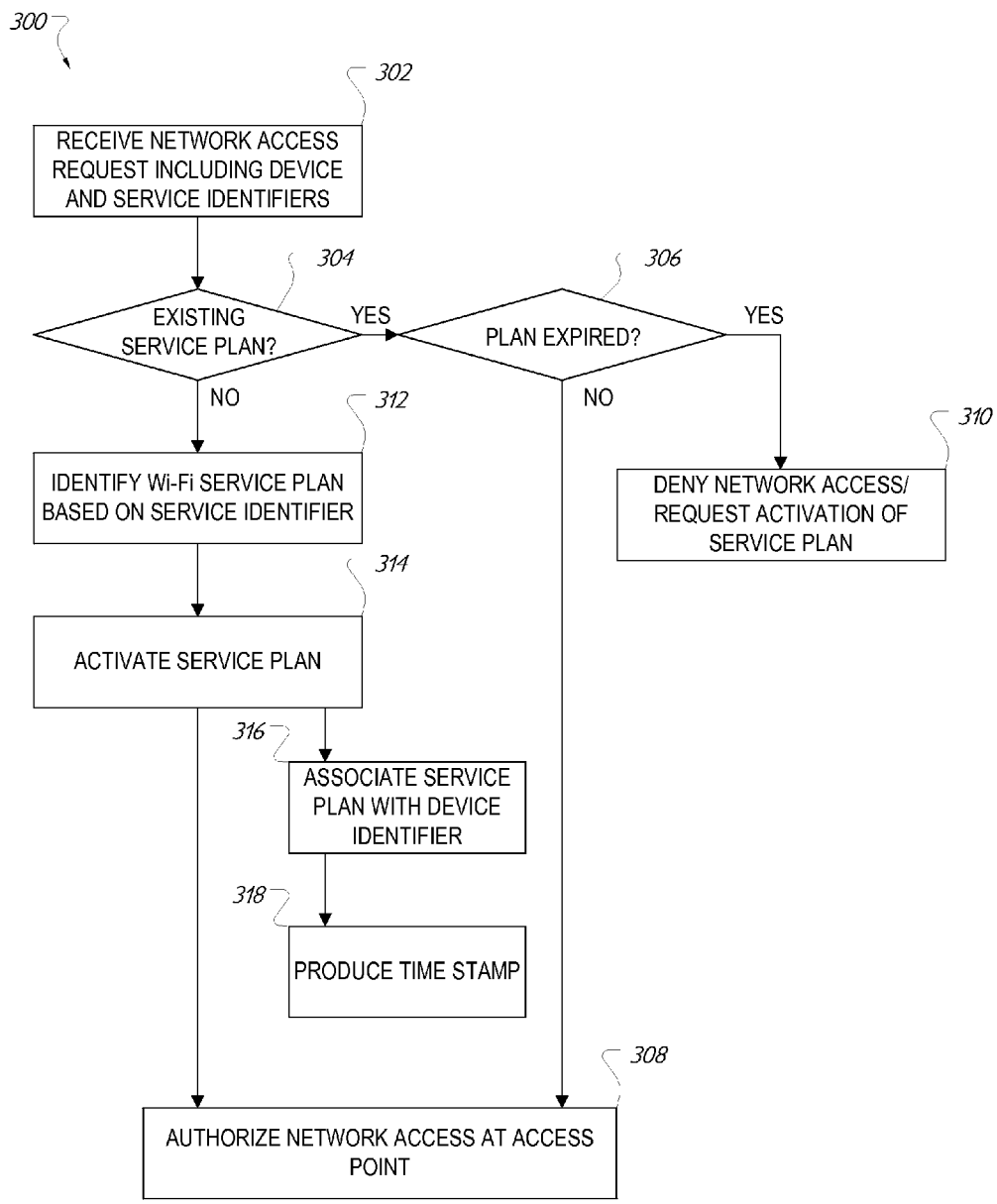
FIG. 3 is a flow diagram illustrating an example of a routine performed by a wireless device and network server for providing wireless network access under the system of FIG. 1.

Referring to FIG. 3, a method 300 for providing a wireless device with access to computer network is shown. The depicted example, the method 300 can be used to set up a temporary account, such as a trial evaluation of a Wi-Fi service. In the method 300, network access is initiated by limited or virtually no user input of the wireless device. For example, a wireless device may automatically create a network connection when it is brought into range of an AP. Additionally or alternatively, the wireless device may create such a connection when it is powered on or when the user acknowledges a confirmation screen on a display of the wireless device.

Referring again to FIG. 3, the method 300 first includes receiving a request from a wireless device that has a unique device identifier and a service identifier (block 302). The wireless device may first transmit these identifiers to an AP via a radio link. The AP may in turn transmit the device and service identifiers in a data packet to a server that is coupled to the AP (via a computer network). In many embodiments, the device and services identifier can be included in one or more header fields of such a data packet. If the device identifier is a MAC address, for example, it is automatically included in the header field.

After receiving a data packet, a server can determine whether the wireless device has an existing Wi-Fi service plan (block 304). For example, a server may use the device identifier to look up in a database whether the user of a particular wireless device has previously activated a service plan (or account) of the device. If a service plan has been activated, the server can determine whether this account is still active or if the account has expired (block 306). If the account has not expired, the server can authorize the network access of the wireless device (block 308).

In contrast to conventional methods of wireless authentication, the authentication of method 300 is based, at least in part, on both the device and service identifiers of the wireless device. For example, the authentication process of mobile phone networks may use a device-swappable subscriber identify module (SIM) card. As a result, the same subscriber may be authenticated to a cellular network on one cell phone today, but later swap the SIM out and place it into another phone the next day. The authentication of method 300, however, uses a device identifier which is embedded into the permanent (e.g. non-removable and alterable) memory of the wireless device. In addition, because the wireless device is accessing an IP network and not a mobile phone network, the method 300 can also employ well established encryption techniques of IP based networks. For example, the header fields and the payload of the data packet may be encrypted (e.g., via HTTPS). In many examples, the data packet can also include the local IP address and/or a physical location of the wireless device. Accordingly, when the wireless device is authorized at the server, these measures may prevent spoofing and surreptitious access to a network. For example, the server can prevent playback attacks by receiving a locally and dynamically assigned TCP/IP address as a key within the service identifier (or other data field of a data packet). This key can be compared with another TCP/IP address that is conventionally associated with data packets as they are transmitted to the server from an AP near the wireless device. Such conventional TCP/IP addresses, for example, can also be located in a header field and could correspond to the physical location of a wireless device. If the dynamic TCP/IP address of the key does not correspond with an expected physical location of the conventional TCP/IP address (e.g. the conventional TCP/IP address of the wireless device indicates that it is in Los Angeles, but instead should be associated with Seattle), the server can deny authentication or access to a wireless service plan. In additional or alternative examples, the method 300 may also use known Wi-Fi based encryption techniques.

If the service plan has expired, the server can indicate to an AP that a wireless device should not have access to the network (block 310). Additionally or alternatively, the server can also provide instructions to the wireless device as to how to re-activate the account or create a new account. For example, the instructions can cause a display of a wireless device to display a customer service phone number or link to a web address to obtain a new account. If the service plan is initially a trial evaluation, the user may access customer services to set up a fee-based account.

Referring to block 312, if the wireless device does not have a service plan, the server identifies a service plan based on the service identifier. In many embodiments, the service plan and corresponding identifier can be based on the manufacturer or vendor of the wireless device. For example, a particular manufacturer or vendor of a digital camera may offer the free trial network access as an incentive to purchase the digital camera or as an incentive to later purchase wireless network access (as under block 310). The service provider can also work out an agreement with the manufacturer or vendor to include such a service identifier. In other examples, the service identifier includes a model or device type that is used in lieu of or in combination with manufacturer or vendor information. Further, in many examples, a fee structure and/or a level of quality of service may be based on a particular manufacture, vendor, model type, or device type. For example, a Wi-Fi enabled digital camera may have a lower rate service plan than a higher bandwidth consuming VoIP device.

Upon identifying a service plan, the service plan can be activated for the wireless device (block 314) and the server can authorize the network access of wireless device access at the AP (block 308). In many embodiments, activating the account includes associating the device identifier with the service plan (block 316). Activating the account may also include associating other types of identifiers with the account, such as a phone number, a user name, a billing address, etc. A user may be able to access the activated account, such as via an online browser. Accordingly, the user can view the service plan and/or modify features of the plan (e.g., billing rate, data plan, etc.). For example, a manufacturer or vendor can provide the user instructions for looking up the MAC address (a device identifier) within a wireless address. This MAC address can then be used by the user or by customer service to access the particular service plan corresponding to the wireless device. Activating the account may also include storing a time stamp corresponding to the activation day in a database (block 318). Such a time stamp may correspond to the time and/or date at which the account was activated. When a predetermined amount of time elapses after this activation time, the service plan can be at least temporarily discontinued.

Referring to FIG. 4, an example is shown of a table 400 with various fields as stored in a database in communication with the server. While the term "field" and "table" are used herein, any type of data structure or data object can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Data structures may conform to conventions of object oriented programming and/or to other types of programming techniques. Any number of data structures and types can be employed herein.

Table 400 shows a unique device identifier field 402, a Wi-Fi service identifier field 404, a Wi-Fi service plan field 406, and other credentials field 408, all of which can correspond to wireless devices 412a-g. For example, the unique identifier field 402 shows the type of identifier that a server uses to identify the wireless devices 412a-g. These fields also have sub-fields that may also store service plan specific values. The other credentials field 408, for example, includes values that correspond to whether an IP address should be used to prevent spoofing and other types of surreptitious access to a network. In one specific example, the digital camera 412a is manufactured by an electronics company that offers a trial 6 month service plan. The digital camera 412b, on the other hand, is not manufactured by this company and therefore its user does not qualify for the free trial user plan. In another example, the mp3 player 412c qualifies for a 3 month trial service plan based on its device type (and not its manufacturer or vendor). In yet another example, a service plan bases its quality of service on device type. In this example, the VoIP phone 412d receives a higher quality of service than the laptop 412e. In yet another example, a service plan bases its rate on the type of vendor that supplies a wireless device. Accordingly, because the VoIP phone 412f is provided by a particular vendor that supplied the phone (i.e., Cellular Service Provider B), the service plan has a reduced rate relative to the VoIP phone 412g.

Referring to FIG. 5, an example is shown of a table 500 that includes header fields 502, 504 corresponding to a data packet that may be sent to a server for Internet Service Provider roaming (WISPr) authentication. The header field 502 is a WISPr username having a default account identifier that can be stored, for example, in the memory of the wireless device. The header field 504 is a WISPr password that is an aggregate of a Wi-Fi service identifier, a flag parameter, a locally and/or dynamically network assigned IP address, a MAC address (i.e., a device identifier), and a default account password. In many examples, the default account and password can be updated to correspond with a user upon activation of a new account. Table 500 also shows example values that may be associated with the WISPr username and password fields 502, 504.

Many alternatives may be employed. In general, alternatives and alternative embodiments described herein are substantially similar to previously described embodiments, and common elements and functions are identified by the same reference numbers. Only significant differences in construction or operation are described in detail.

Under one alternative, a user may purchase a rate plan that allows that user to use any wireless device in a given set, category, class or family. For example, a user may purchase a rate plan that allows that user to use any Wi-Fi-enabled camera within the network. Near-field communications, such as Bluetooth, can be used to exchange manufacturer/model codes or other identifiers or keys between Wi-Fi devices, all of which would be usable under the common plan for that category of devices. The database and network server would track (and confirm) each device within the category.

Under another alternative, a mobile phone or similar device could be used to exchange device codes between authorized Wi-Fi devices. Therefore, rather than use a manufacturer code among similar devices within a category (e.g., Wi-Fi cameras category), the mobile phone exports its phone number to each Wi-Fi device in the category. Those devices in turn add that phone number to their embedded manufacturer and model codes, which are then provided to the APs. The network server receives the manufacturer and model codes along with the phone number to associate those devices with a common plan and thereby enable a user to receive a single rate plan for multiple devices in a given category.

Under yet another alternative, a wireless device can include a peripheral attachment that associates device and service identifiers for a particular device. For example, a laptop can be coupled to a USB memory 'stick' for enabling VoIP communication. The USB stick may use the device identifier of the laptop (e.g., a MAC address) and associate its own service identifier with a Wi-Fi transmission that it communicates to an AP. It is also contemplated that such peripheral attachments could be exchanged to provide additional or alternative features. For example, a USB memory 'stick' could be swapped out with another USB memory 'stick' that offers a different quality of service or a different rate plan. The use of the peripheral attachment is an example only, and the above functionality can be implemented solely in software with appropriate security measure, such as encryption.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the inventors reserve the right to add additional claims after filing the application to pursue such additional claim forms for other aspects of the invention.

We claim:

1. At least one computer-readable storage medium, excluding transitory signals, and carrying instructions to perform a method in a wireless device for requesting and obtaining Wi-Fi access to a computer network, the method comprising:
    transmitting, from a wireless device, a message regarding a request for the wireless device to access a computer network,
        wherein the message includes a device identifier and a Wi-Fi service identifier, and
        wherein the Wi-Fi service identifier corresponds to a variable characteristic associated with the wireless device; and
    accessing, by the wireless device, information via the computer network, wherein prior to accessing the information:
        a service plan is associated with the wireless device based on at least the Wi-Fi service identifier,
            wherein the associating is initiated without user input,
            wherein the service plan is for wireless access to the computer network and not to a cellular phone network; and
        wireless access between the wireless device and a Wi-Fi access point coupled to the computer network is authenticated based on the service plan,
            wherein the authenticating of the wireless access is not performed based on use of a subscriber identity module (SIM) associated with the wireless device, and
            wherein the authenticating is performed without user input at the wireless device.

2. The computer-readable storage medium of claim 1 wherein the variable characteristic is a device type, location, data type, or data payload type associated with the wireless device.

3. The computer-readable storage medium of claim 2 wherein the variable characteristic is a data type or data payload type corresponding to voice traffic, wirelessly accessed video, or audio content.

4. The computer-readable storage medium of claim 1 wherein the Wi-Fi service identifier is further based on at least one of a model type, device type, manufacturer code, or vendor code.

5. The computer-readable storage medium of claim 1 wherein a time stamp corresponding to an activation time of the service plan is produced and the service plan is at least temporarily discontinued when a predetermined amount of time elapses after the activation time.

6. The computer-readable storage medium of claim 1 wherein the message is transmitted as a data packet and at least one of the device identifier and the Wi-Fi service identifier is located in one or more header fields of the data packet.

7. The computer-readable storage medium of claim 1 wherein the device identifier is transmitted securely, and wherein the service plan is based on an amount of bandwidth that is consumable by the wireless device under the service plan.

8. A non-transitory computer-readable storage medium whose contents cause at least one processor to perform a process in a wireless device for accessing a wireless packet-switched computer network under a service plan, the wireless packet-switched computer network including one or more of a wireless local area network (WLAN), a wireless wide area network (WWAN), or a wireless metropolitan area network (WMAN), the process comprising:
    wirelessly transmitting a first data packet from a wireless device to a packet-switched computer network that is coupled to a server and a first wireless access point, wherein the first data packet includes a wireless service identifier corresponding to a variable characteristic associated with a wireless access device; and wherein the first data packet also includes a unique device identifier corresponding to the wireless device;

accessing, by the wireless device, information via the packet-switched computer network, wherein prior to accessing the information:

a service plan is identified based on the wireless service identifier, wherein the identifying is initiated without user input at the wireless device, the service plan being a temporary service plan;

the identified service plan is associated with the device identifier, wherein the associating is initiated without user input at the wireless device; and a second data packet is communicated to the first access point, wherein the second data packet enables the wireless device to access one or more of the WLAN, WWAN, or WMAN under the identified service plan, and wherein the WLAN, WWAN, or WMAN are IP based computer networks and are not mobile telephone networks, and wherein the communicating is initiated without user input at the wireless device.

9. The non-transitory computer-readable storage medium of claim 8 wherein the variable characteristic is a device type or location, or data type or data payload type, wherein the data type or data payload type correspond to voice traffic, wirelessly accessed video, or audio content.

10. The non-transitory computer-readable storage medium of claim 8 wherein at least one of the device identifier and the service identifier is located in one or more header fields of the first data packet.

11. The non-transitory computer-readable storage medium of claim 8 wherein prior to the second data packet being communicated to the first access point:

a locally and dynamically assigned TCP/IP address embedded as a key in the first data packet is compared with another TCP/IP address associated with the first data packet and corresponding to a physical location of the wireless device; and use of the identified service plan is authenticated based on the comparison of the locally and dynamically assigned TCP/IP address and the TCP/IP address corresponding to the physical location of the wireless device.

12. The non-transitory computer-readable storage medium of claim 8 wherein the method further includes:

transmitting a third data packet from the wireless device to a second access point coupled to the computer network, the third data packet including the device identifier, and being transmitted at a time when the wireless device is no longer accessing the computer network through the first access point;

identifying the identified service plan based at least in part on the device identifier; and receiving, at the wireless device, a fourth data packet that enables the wireless device to re-access the computer network through the second access point.

13. The non-transitory computer-readable storage medium of claim 8 wherein the identified service plan is discontinued at least temporarily when a predetermined amount of time elapses after an activation of the identified service plan, and wherein a third data packet is communicated to the wireless device, the communicated third data packet including an indication that the identified service plan is discontinued, and/or an indication with instructions corresponding to re-activating the identified service plan or activating a new service plan.

14. The method of claim 8 wherein the device identifier is transmitted securely.

15. A method in a wireless device for obtaining Wi-Fi access to a computer network, the method comprising:

transmitting, from a wireless device, a message regarding a request for the wireless device to access a computer network, wherein the message includes a device identifier and a Wi-Fi service identifier; and accessing, by the wireless device, information via the computer network, wherein prior to accessing the information:

a service plan is associated with the wireless device based on at least the Wi-Fi service identifier, wherein the associating is initiated automatically, wherein the service plan is based on an amount of bandwidth that is consumable by the wireless device under the service plan, and automatically associating the device identifier with the service plan; and wireless access between the wireless device and a Wi-Fi access point coupled to the computer network is automatically authenticated based on the service plan, wherein the automatic authenticating of the wireless access is not based on use of a subscriber identity module (SIM) associated with the wireless device.

16. The method of claim 15 wherein the wireless device is a camera or an audio device.

17. The method of claim 15 wherein the wireless device exchanges one or more codes or identifiers with at least one other wireless device in a predetermined group of wireless devices to enable wireless access under the service plan.

18. The method of claim 17 wherein at least one code or identifier is a telephone number, and wherein the service plan is a common rate plan for allowing two or more wireless devices that belong to the predefined group of wireless devices to wirelessly access the computer network and not to wirelessly access a cellular phone network.

19. The method of claim 15 wherein the service plan is further based on at least one of a model type, device type, manufacturer code, or vendor code.

20. The method of claim 15 wherein the device identifier is transmitted securely.

* * * * *